United States Patent [19]
Zuckerman

[11] Patent Number: 4,891,628
[45] Date of Patent: Jan. 2, 1990

[54] ENVIRONMENTAL MATTER DETECTION SYSTEM

[76] Inventor: Leonard Zuckerman, 1 Westcliff Dr., Dix Hills, N.Y. 11746

[21] Appl. No.: 291,528

[22] Filed: Dec. 29, 1988

[51] Int. Cl.$^4$ .............................................. G08B 19/02
[52] U.S. Cl. .................... 340/582; 244/134 F
[58] Field of Search ................. 340/580, 601, 582; 73/170 R; 244/134 F, 134 D

[56] References Cited

U.S. PATENT DOCUMENTS

| | | | |
|---|---|---|---|
| 4,176,524 | 12/1979 | Kamiyama et al. | 340/582 |
| 4,553,137 | 11/1985 | Marxer et al. | 340/582 |
| 4,568,922 | 2/1986 | Schuippert et al. | 340/582 |
| 4,570,881 | 2/1986 | Lustenberger | 340/582 |
| 4,611,492 | 9/1986 | Kousmann | 340/582 |
| 4,688,185 | 8/1987 | Masenheim | 340/580 |

Primary Examiner—Joseph A. Orsino
Assistant Examiner—Frank M. Scutch, III
Attorney, Agent, or Firm—Seymour Levine

[57] ABSTRACT

A matter sensing apparatus includes a piezoelectric transducer, having a face susceptible to matter accretions at a surface for which matter accretion detection is desired. The electrical circuit of the transducer is coupled in the feedback path of an amplifier to establish an oscillator that oscillates at frequencies determined by the resonant frequency of the transducer and the loading on its face. The oscillator signals are converted to binary signals and utilized with binary signals, provided by a thermostat, that a representative of temperatures above or below a selected temperature to provide signals indicative of whether ice or other matter has accredited on the surface.

10 Claims, 1 Drawing Sheet

ENVIRONMENTAL MATTER DETECTION SYSTEM

BACKGROUND OF THE INVENTION

1. Field of the Invention

The present invention relates to the field of ice detectors and more particularly to ice detectors utilizing the vibration characteristics of piezoelectric transducers.

2. Description of the Prior Art

Ice detectors in the prior art determine frequency changes of virbrating diaphragm, positioned on a surface to establish ice formation on that surface. These diaphragms are driven by electromagnets energized by an alternating current source at a predetermined frequency or by an energized piezoelectric transducer vibrating at its natural frequency. As the ice accumulates the vibration frequency of the diaphragm is altered. When this frequency variation exceeds a predetermined value an indication that ice has formed on the surface is provided. In the devices utilizing piezoelectric transducers the load on the diaphragm alters its vibration frequency causing the second diaphragm, coupled to a second piezoelectric transducer, to vibrate. The vibration of the second diaphragm induces vibrations in the piezoelectric transducer coupled thereto, which in turn provides a signal indicative of such vibrations. This coupling arrangement provides a device that is needlessly complex. Frequency changes of a piezoelectric transducer will occur when it has a surface directly exposed to the environment. Further, the continuous vibrations impede ice accretions on the diaphragm, thus adversely affecting the accuracy of the measurements. Additionally, frequency variations occur with loading changes on the diaphragm or transducer, thus providing ice formation indications when matter, other than ice, establish the load. The possibility of false ice warnings, when ice in fact has not formed on the surface, render the warnings suspect.

SUMMARY OF THE INVENTION

An environmental matter detection system in accordance with the principles of the present invention includes a vibrating element, such as a piezoelectric transducer, mounted with one of its surfaces exposed to weather elements, in the plane of a surface for which detection of ice accretions is desired. This vibrating element is electromechanically resonant at a frequency that is a function of the characteristics of the element and of the loading on its surfaces. The vibrating element is coupled in the feedback circuit of an oscillator to cause the oscillator to oscillate at the resonant frequency of the vibrating element. A frequency to voltage converter receives the output signals of the oscillator and provides voltages representative of the oscillating frequency. These voltages are then compared to a voltage that is representative of a vibration frequency at which ice begins to form at the surface of the vibrating element to provide a signal at one of two levels that is representative of ice loading on the surface or no ice loading on the surface. The binary signal so obtained is coupled to a data generator along with a binary signal from a thermostat which is representative of a temperature above or below a selected temperature. The four possible combinations of the two signals provide information regarding the formation of ice on the surface.

In a second embodiment of the invention the oscillator is designed to cease oscillating when ice has formed on the surface of the vibrating element. In accordance with the invention, however, the oscillations continue when only small amounts of dirt and/or water accumulate on the surface of the vibrating element. An oscillation detector provides a binary signal representative of ice and no ice on the surface of the vibrating element. This binary signal is coupled to a data generator along with a binary signal from a thermostat. If an ice indication is provided by the signal from the oscillation detector and a temperature indication is given from the thermostat that precludes the possibility of ice forming on the surface, the data generator will provide a signal indicative of no ice. In this manner loadings on the vibrating element which cause the vibration to cease that are not due to ice are detected and a false indication of ice is prevented.

The invention will be more fully described with reference to the accompanying drawings

DESCRIPTION OF THE PREFERRED EMBODIMENTS

Figure 1:
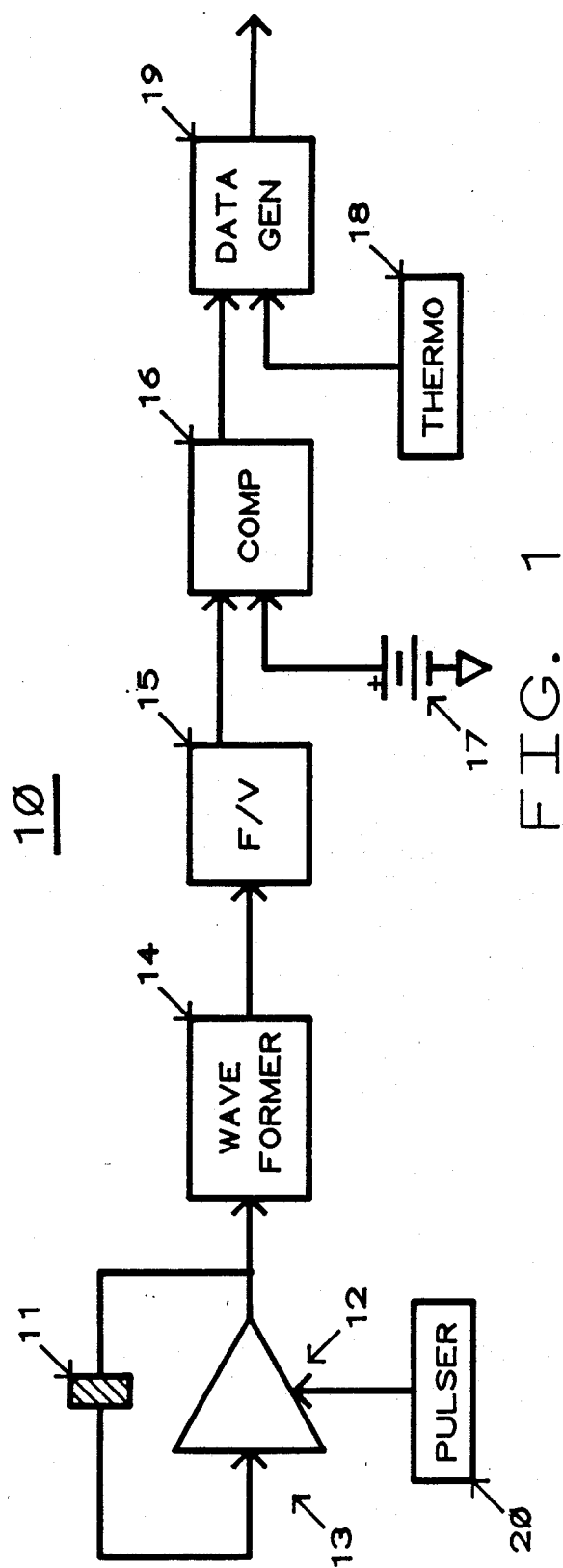
FIG. 1 is a block diagram of a preferred embodiment of the invention.

A sensor, generally indicated at 10, for detecting ice accretions on a surface may include a forced vibrations element 11, as for example a piezoelectric transducer, is driven in the feedback circuit of an amplifier so as to cause the amplifier to oscillate. Vibrations of the piezoelectric transducer 11 control the frequency of the oscillator. These vibrations are functions of the resonant frequency of the transducer which is a function of the characteristics of the transducer and the mechanical loading on its face. Thus oscillating frequencies are realized that differ with different loadings, as would be provided by dry air, moisture, ice, or foreign matter. The signal output of the oscillator circuit 13 is coupled to a wave forming circuit 14 from which a rectangular wave, having the same frequency as the signal provided by the oscillating circuit, is coupled to a frequency-to-voltage converter 15. The voltage at the output terminal of the converter 15 is representative of the resonant frequency of the transducer as loaded. Thus, a voltage $V_1$ is provided when the loading is due only to the air pressure on the face of the transducer and voltage $V_2$ is provided when the face of the transducer is encrusted with ice. The output voltage from the converter 15 is coupled to a comparator 16 wherein a comparison is made to a voltage $V_3$, provided by a source 17. Voltage $V_3$ is at a level that is between the levels of voltages $V_1$ and $V_2$, and is representative of a transition between no ice and ice on the surface under consideration, i.e. a condition at which accretions of ice begin. Consequently, the output of the comparator 16 is a signal at one of two levels, one level indicating an ice condition, the other level indicating no ice.

Since the transducer may not discriminate between a load created by ice encrusted on its face and other matter that may adhere thereto, situations can exist for which the output voltage from the comparator 16 may be that associated with an encrustation of ice on the face of the transducer, when in reality no ice has accreted. To resolve such an ambiguity a thermostat 18 is provided which provides a signal at one of two levels, one level indicating a temperature at the surface above a selected temperature, the other level indicating a surface temperature below the selected temperature. The transition temperature is selected such that ice can not form at temperatures that are higher than the selected one. A temperature of 0° C. (32° F.) appears to be the logical choice. This temperature, however, is not sufficiently definitive and a better choice would be somewhat higher. The output signals from the comparator 16 and thermostat 18 are coupled to a data generator 19 wherefrom a signal is provided that indicates one of four possible conditions; ice accreted on the surface, no ice on the surface and the temperature at the surface is below the selected temperature, the temperature at the surface is above the selected temperature and the only load on the face of the transducer is air and the temperature at the surface is above the selected temperature and foreign matter has adhered to the face of the transducer.

Ice should accrete on the face of the transducer at a rate that is similar to the rate at which it accretes on other surfaces in its vicinity. The rate of ice accretion on the face of the transducer, however, may be significantly affected by the motion of its face due to the forced vibrations. Should such a condition exist, a pulser 20 may be utilized which is coupled to cyclically deactivate the vibrating element and amplifier for a time duration sufficient to permit ice accretions on the face of the transducer, which may be several minutes. After the deactivation period has elapsed, pulser 20 reactivates the vibrating element and amplifier for a short period of time, which may be a few hundredths of a second, during which the sensor operates as described above. Operating the system with short duty cycles significantly reduces the caloric energy dissipated in the immediate environment of the vibrating element as well as the system power requirements. The reduced power requirements provides a system that is operable on solar cells or small storage batteries and permits transfer of data via a radio link, thus significantly reducing installation costs.

Figure 2:
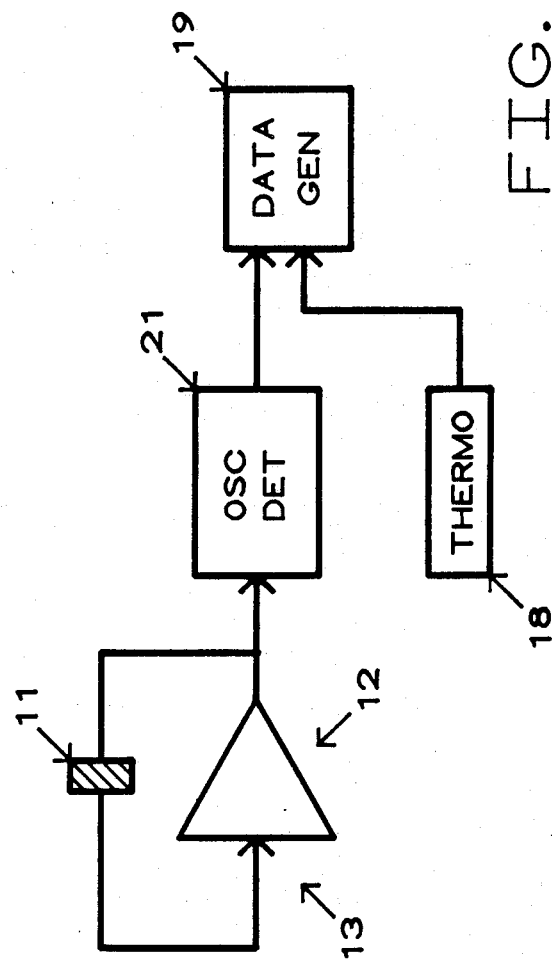
FIG. 2 is a block diagram of a second preferred embodiment of the invention.

As ice loading on the transducer 11 increases it requires more driving power to maintain its oscillation. If the driving power is fixed the transducer 11 will cease to vibrate when the loading exceeds the limit at which the driving power will induce vibrations. When this occurs the oscillator 13 will cease to operate. This situation may be utilized to provide the ice detector shown in FIG. 2, wherein elements similar to elements in FIG. 1 bear the same reference numerals. In FIG. 2 the oscillator 13 is coupled to an oscillation detector 21, which may comprise a diode circuit, that provides a signal at one level if the oscillator is operating and a signal at a second level if it is not oscillating. A thermostat 18, previously described, provides a signal at one level if the surface temperature is above the selected temperature and a signal at a second level if the surface temperature is below the selected temperature. Signals generated by the oscillation detector 21 and the thermostat 18 are coupled to the data generator 19, which provides the output data previously described.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. An apparatus for sensing matter accretions on a surface comprising:
    an electro-mechanical transducer having a face directly exposed to matter accretions at said surface and a vibration frequency responsive to matter accretions on said face;
    oscillator means coupled to said transducer for oscillating at a frequency controlled by said vibration frequency;
    means coupled to said oscillator means for providing first signals representative of said oscillating frequencies;
    thermostat means for providing second signals representative of temperatures of said surface; and
    means responsive to said first and second signals for providing signals representative of matter conditions on said face.

2. The apparatus of claim 1 wherein said first signals means includes:
    means responsive to signals generated by said oscillator means for providing rectangular waves at said frequencies;
    converting means coupled to said rectangular waves means for providing signals representative of said frequencies; and
    means responsive to said signals provided by said converting means for providing said first signals.

3. The apparatus of claim 2 wherein:
    said first signals means includes comparator means wherefrom said first signals are provided at a first level when said signals from said converting means exceed a predetermined threshold and at a second level when said signals from said converting means do not exceed said predetermined threshold; and
    said thermostat means provides said second signals at a first level when said temperatures exceed a preselected temperature threshold and at a second level when said temperatures do not exceed said preselected threshold.

4. The apparatus of claim 1 further including means for cyclically activating and deactivating said oscillator means.

5. The apparatus of claim 4 wherein said oscillator means is deactivated for intervals that are much longer than intervals during which said oscillating means are activated.

6. The apparatus of claim 1 wherein said electro-mechanical transducer is a piezoelectric transducer.

7. An apparatus for sensing matter accretions on a surface comprising:
    an electro-mechanical transducer having a face directly exposed to matter accretions at said surface and a vibration frequency responsive to matter accretions on said face such that said vibration frequency decreases with loads on said face created by said matter accretions;
    oscillator means coupled to said transducer for providing oscillations at a frequency controlled by said vibration frequency;
    said transducer and oscillator means constructed and arranged such that said oscillations terminate when a predetermined load level is accumulated on said face;
    means coupled to said oscillator means for detecting said oscillations and providing a first signal having a first level when said oscillations are detected and a second level when oscillations are not detected;

means for providing a second signal having a first level when temperatures at said surface exceed a preselected temperature and a second level when temperatures at said surface do not exceed said preselected temperature; and means responsive to said first and second signals for providing signals representative of matter accretions on said surface or no matter accretions on said surface and type of said accretions on said surface.

8. The apparatus of claim 7 further including means for cyclically activating and deactivating said oscillator means.

9. The apparatus of claim 8 wherein said oscillating means is deactivated for intervals that are much longer than intervals during which said oscillator means are activated.

10. The apparatus of claim 7 wherein said forced vibration element is a piezoelectric transducer.

* * * * *